(12) United States Patent
Delaporte (10) Patent No.: US 12,366,889 B2
(45) Date of Patent: *Jul. 22, 2025

(54) FLEXIBLE DISPLAY DEVICES WITH A PLANAR CONNECTION INTERFACE

(71) Applicant: Lepton Computing LLC, Brooklyn, NY (US)

(72) Inventor: Stephen E. Delaporte, New York, NY (US)

(73) Assignee: Lepton Computing LLC, Brooklyn, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/601,812

(22) Filed: Mar. 11, 2024

(65) Prior Publication Data

US 2024/0210998 A1 Jun. 27, 2024

Related U.S. Application Data

(63) Continuation of application No. 17/977,490, filed on Oct. 31, 2022, now Pat. No. 11,960,325, which is a continuation of application No. 17/211,645, filed on Mar. 24, 2021, now Pat. No. 11,526,197.

(60) Provisional application No. 62/994,161, filed on Mar. 24, 2020.

(51) Int. Cl.
*G06F 3/041* (2006.01)
*G06F 1/16* (2006.01)

(52) U.S. Cl.
CPC .......... *G06F 1/1652* (2013.01); *G06F 1/1647* (2013.01); *G06F 3/041* (2013.01); *G06F 2203/04102* (2013.01)

(58) Field of Classification Search
CPC ........ G06F 1/16; G06F 1/1647; G06F 1/1652; G06F 3/041; G06F 2203/04102; G06F 1/1616; G06F 1/1632; G09G 9/301; G09F 9/301; H04M 1/0268
See application file for complete search history.

(56) References Cited

U.S. PATENT DOCUMENTS

| | | | |
|---|---|---|---|
| 9,941,918 B2* | 4/2018 | Kim | H04B 1/3827 |
| 10,613,586 B2* | 4/2020 | Yamazaki | H10K 77/111 |
| 11,599,158 B2* | 3/2023 | Delaporte | G06F 1/1616 |

(Continued)

*Primary Examiner* — Joe H Cheng
(74) *Attorney, Agent, or Firm* — Shore IP Group, PLLC; Sean R. Wilsusen (57) ABSTRACT

Foldable touch screen display devices with a flexible display unit made up of segments that can be reconfigured from a compact state to an expanded state which includes a modular rigid display that may be attached to the flexible display unit. The form factor of the compact state is roughly the size of a typical handheld phone or smaller. The form factor of the expanded state is roughly the size of a larger phone or tablet computer. A third state whereby the attached rigid display is folded out such that its top surface is aligned with the top surface of the unfolded flexible display, may provide the use of both displays simultaneously. All folded states may include an integrated speaker and microphone. In one embodiment, a module attached to, situated within, or otherwise associated with at least one segment of the flexible display or rigid display may contain all or substantially all processing and memory, along with a communications system, which may be used in any state.

9 Claims, 8 Drawing Sheets

(56) References Cited

U.S. PATENT DOCUMENTS

| | | | |
|---|---|---|---|
| 11,614,779 B2* | 3/2023 | Delaporte | G06F 1/1616 |
| | | | 361/679.01 |
| 2003/0071832 A1* | 4/2003 | Branson | G06F 3/1446 |
| | | | 345/698 |
| 2003/0160735 A1* | 8/2003 | Lee | G06F 3/147 |
| | | | 345/4 |
| 2010/0060664 A1* | 3/2010 | Kilpatrick, II | G06F 1/1684 |
| | | | 345/1.3 |
| 2012/0038570 A1* | 2/2012 | Delaporte | G06F 1/1616 |
| | | | 345/173 |
| 2015/0277496 A1* | 10/2015 | Reeves | G09F 9/301 |
| | | | 345/1.2 |
| 2017/0038641 A1* | 2/2017 | Yamazaki | G02F 1/133308 |
| 2020/0012318 A1* | 1/2020 | Delaporte | G06F 1/1616 |
| 2021/0132660 A1* | 5/2021 | Delaporte | G06F 1/1679 |
| 2021/0303092 A1* | 9/2021 | Delaporte | H04M 1/0268 |

* cited by examiner

FLEXIBLE DISPLAY DEVICES WITH A PLANAR CONNECTION INTERFACE

REFERENCE TO RELATED APPLICATIONS

This application is a continuation of U.S. patent application Ser. No. 17/977,490, filed Oct. 31, 2022, now U.S. Pat. No. 11,960,325, which is a continuation of U.S. patent application Ser. No. 17/211,645, filed Mar. 24, 2021, now U.S. Pat. No. 11,526,197, which claims priority to U.S. Patent Application No. 62/994,161, filed Mar. 24, 2020 and titled "FLEXIBLE DISPLAY DEVICES WITH A MODULAR RIGID DISPLAY," which are incorporated herein by reference in their entirety.

FIELD OF THE INVENTION

The present invention relates generally to computing devices, and more particularly, to a computing device with a touch screen display that can be folded from a compact state to an expanded state.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. Additionally, in such handheld computing devices as a touch screen mobile phone, the limited size of the display can significantly reduce the viewing capacity while watching videos, using graphic-intensive applications, and reading text. The rigid nature of a standard touch screen display can also limit the portability of a device when its form factor is on the larger size range for a phone, or at the scale of a tablet, which makes folding a desirable feature.

There is therefore a need for touch screen displays having increased size without sacrificing the convenience of a small device

SUMMARY OF EMBODIMENTS OF THE INVENTION

To mitigate the difficulties associated with having a single rigid touch screen display device, variations on flexible displays and the implementation of multiple screen displays have been proposed and implemented to enable the transformation of a display from a compact state to an expanded state. Although the use of flexible displays and multiple screen displays offer the advantages of a transformation in scale, there are still a number of limitations as to how they can be implemented. For example, when a flexible display device can fold to a compact state such that it is closed like a book, a rigid display must be integrated on the back side of the device so that the device can be further used as a phone or for notifications depending on how small the device's folded state is. However, having a rigid display on the back side can be extraneous when the flexible display portion of the device is unfolded and being used. To overcome this limitation, providing modularity and a connection interface between the flexible display and the rigid display to be used within a single device provides greater capacity in terms of folding configurations and use cases, i.e., the flexible display or rigid display can be used within separate standalone devices or integrated together within one device.

There is a need for a computing device that can retain the form factor and functionality of a phone, while also providing a touch screen display that can be reconfigured from a compact state to an expanded state. Furthermore, there is a need for a foldable device that provides modularity when the device integrates both flexible displays and rigid displays. A modular interface between displays would ultimately bring greater adaptability to such devices.

Foldable touch screen display devices with a flexible display unit made up of segments that can be reconfigured from a compact state to an expanded state which includes a modular rigid display that may be attached to the flexible display unit is disclosed. The form factor of the compact state is roughly the size of a typical handheld phone or smaller. The form factor of the expanded state is roughly the size of a larger phone or tablet computer, which may also include the mechanical functionality of a laptop. A third state whereby the attached rigid display is folded out such that its top surface is aligned with the top surface of the unfolded flexible display, may provide the use of both displays simultaneously. All folded states may include an integrated speaker and microphone. The devices may further include sensors to indicate the state of configuration and mechanisms for alignment, locking, and structural support. In one embodiment, a module attached to, situated within, or otherwise associated with at least one segment of the flexible display or rigid display may contain all or substantially all processing and memory, along with a communications system, which may be used in any state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1:
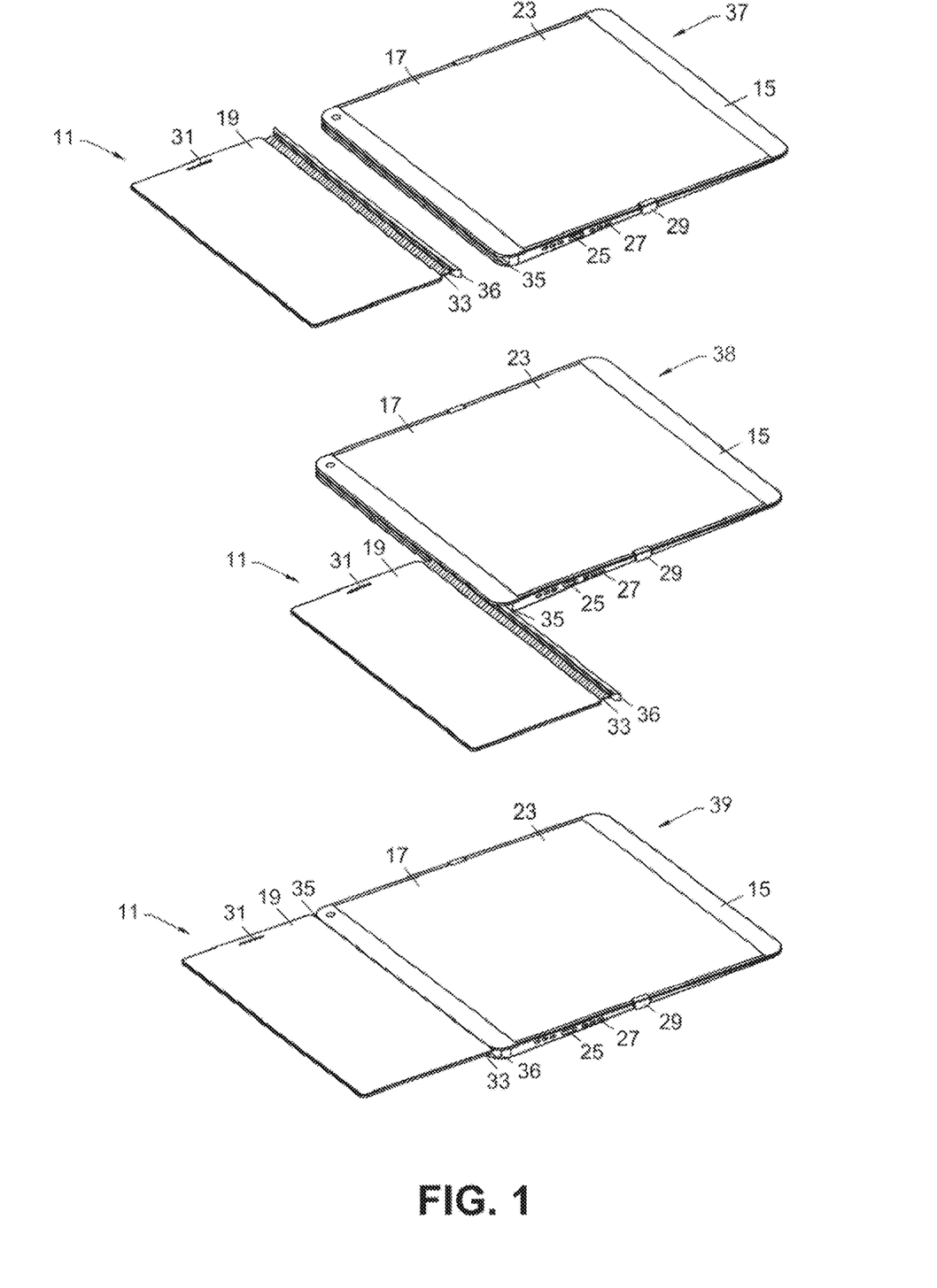
FIG. 1 is a diagram showing a rigid display being attached to the flexible display portion of a foldable computing device through a sliding connector interface.

In accordance with the exemplary embodiment shown in FIG. 1, a foldable computing device 15 is shown with a single flexible display made up of a first flexible display segment 17 and a second flexible display segment 23 that can both fold flat against each other through hinge 29, which is situated below and in between both segments. The diagram of FIG. 1 further illustrates a rigid display module 11 being attached to the left side of first flexible display segment shown with foldable computing device 15 through sliding channel interface 35. The top image 37 shows rigid display module 11 detached from foldable computing device 15, while the middle image 38 shows rigid display module 11 slid partially into sliding channel interface 35 on the left side of foldable computing device 15. Rigid display module 11 is then shown in the bottom image 39 fully engaged with foldable computing device 15. Rigid display module 11 is made up of rigid display 19 and a speaker opening 31. Sliding connector 36 is attached to rigid display 11 through a flexible material 33 which allows rigid display 11 to fold along the edge of foldable device 15 when sliding connector 36 it attached to sliding channel interface 35. Flexible material 33 could also be replaced with a rigid mechanism that might be hinged together in sections, or through other means, so that rigid display 11 can be folded from the position it is shown in FIG. 1, to the back side of foldable device 15 which is further illustrated in FIG. 5. A peripheral port 25 is situated at the bottom of foldable device 15 along with speaker and microphone openings 27. It is important to note that the sliding channel interface and the sliding connector could be swapped such that the sliding channel interface is integrated along the edge of rigid display module 11 while the sliding connector is integrated along the edge of foldable computing device 15.

Figure 2:
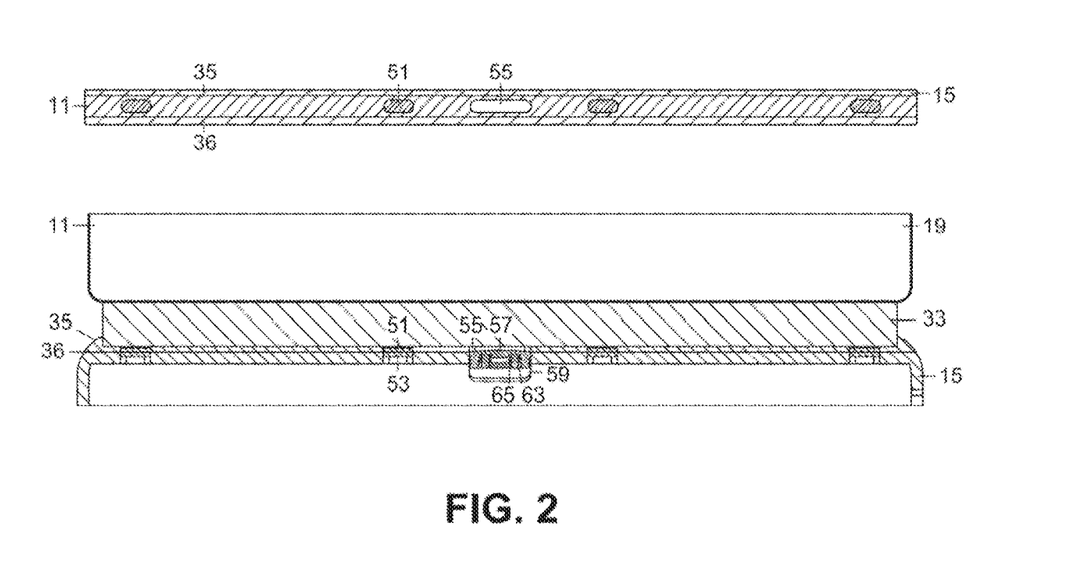
FIG. 2 is a sectional side view and top view of a locking mechanism and supporting magnetic connections for the sliding connector interface illustrated in FIG. 1
Figure 3:
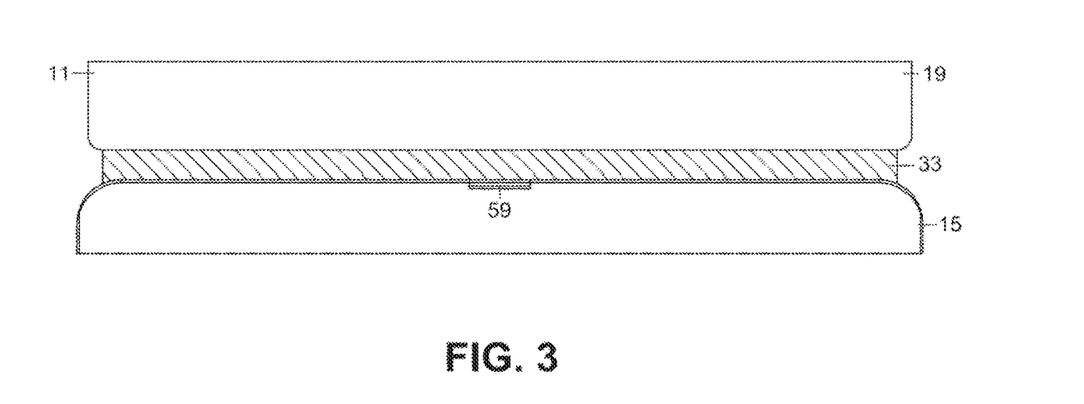
FIG. 3 is a view of a release button situated on the back side of the interface shown in FIG. 1 and FIG. 2 that unlocks the sliding connector.
Figure 4:
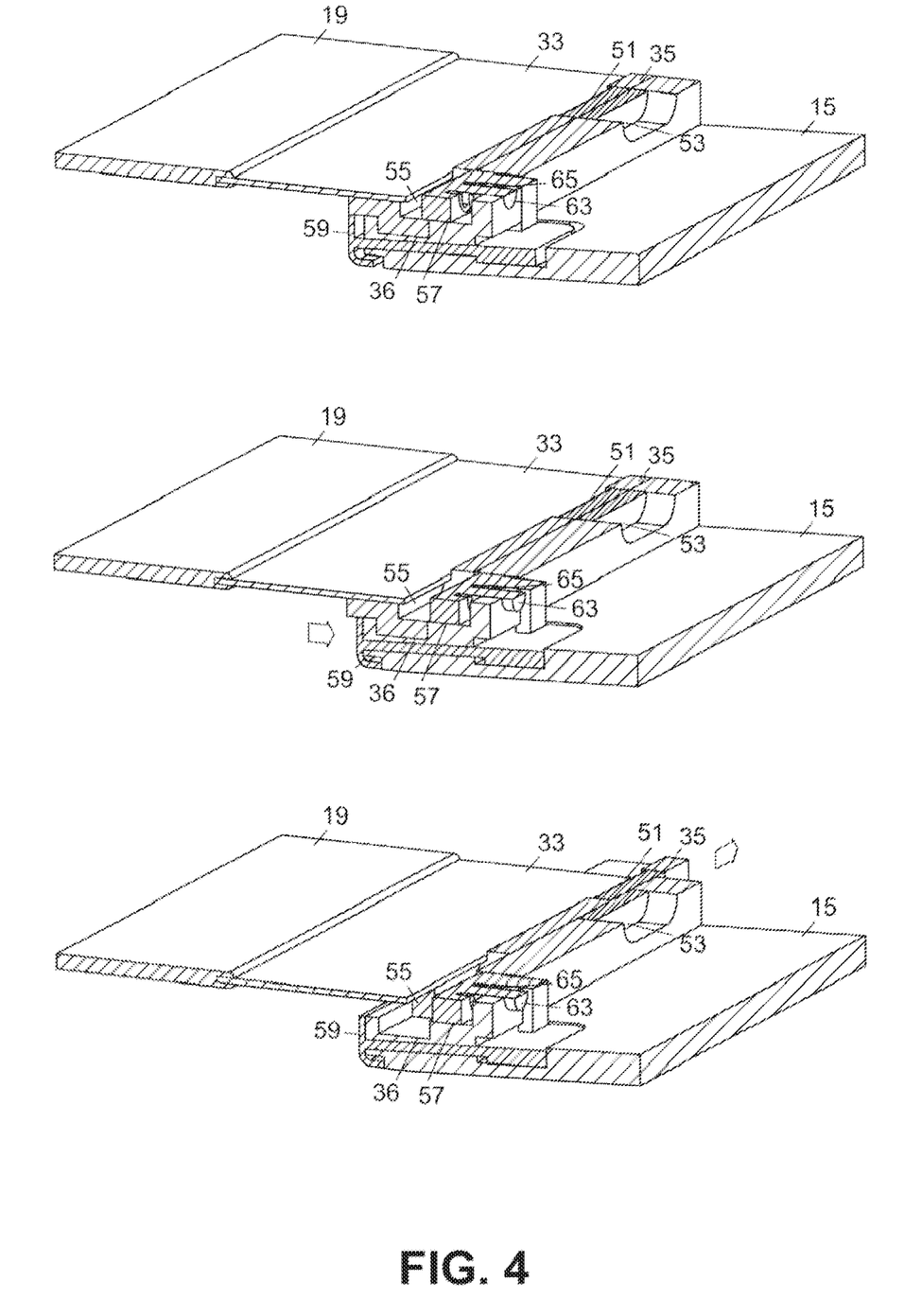
FIG. 4 is a diagram showing three sectional views of the release button and locking mechanism from FIG. 2 and FIG. 3 transitioning from a locked state to an unlocked state.

To elaborate on sliding channel interface 35 and sliding connector 36 which engages with it, FIG. 2 illustrates a sectional detailed view of this configuration and the locking mechanism 57 that locks sliding connector 36 within sliding channel interface 35. Ultimately, for locking mechanism 57 to hold sliding connector in place, a spring 65 which surrounds post 63 attached with locking mechanism 57 forces it forward to engage with opening 55 where interface pins for communicating data and transferring power between rigid display module 11 and foldable computing device 15. Magnet 51, which is attached to sliding connector 36 connects with magnet 53, which is attached to the inside of sliding channel interface 35 to allow both parts to be coupled together when sliding connector 36 is slid within sliding channel interface 35. Magnets are shown populated throughout each side of the interface next to magnet 51 and magnet 53 to allow for greater connection strength between sliding connector 36 and sliding channel interface 35. Release button 59 is attached to locking mechanism 57 so that it can be accessed by a user of the device from the bottom side of the folding computing device 15. Release button 59 is also shown on the bottom side of folding computing device 15 in FIG. 3 where it is situated within a channel so that it can slide inward to release sliding connector 36. FIG. 4 further illustrates locking mechanism 57 with three sectional drawings of the locking sequence. The top section shows the device in a locked state where locking mechanism 57 is engaged with opening 55 from sliding connector 35 allowing the two parts to be in a fixed position. In the middle sectional drawing, release button 59 and locking mechanism are shown in a retracted position which releases sliding connector 35 so that is can freely slide inward or outward to be attached or detached from foldable computing device 15. The final sectional drawing at the bottom of FIG. 4 shows sliding connector 35 repositioned to illustrate how it is free to slide outward so that rigid display module 11 can be fully unlocked and detached. It should be noted that while rigid display module 11 is shown as a separate component that is being attached to mobile computing device 15 which contains the flexible display, core electronics, and peripheral interfaces of the device, rigid display module 11 may carry the core electronics and peripherals of the device with the flexible display acting as the module instead. Sliding connector 35 could also be used implemented to attach to foldable mobile device 15 such that it doesn't require a sliding mechanism. It could instead simply plug into the side of foldable mobile device 15 or connect to it with magnets and interface pads.

Figure 5:
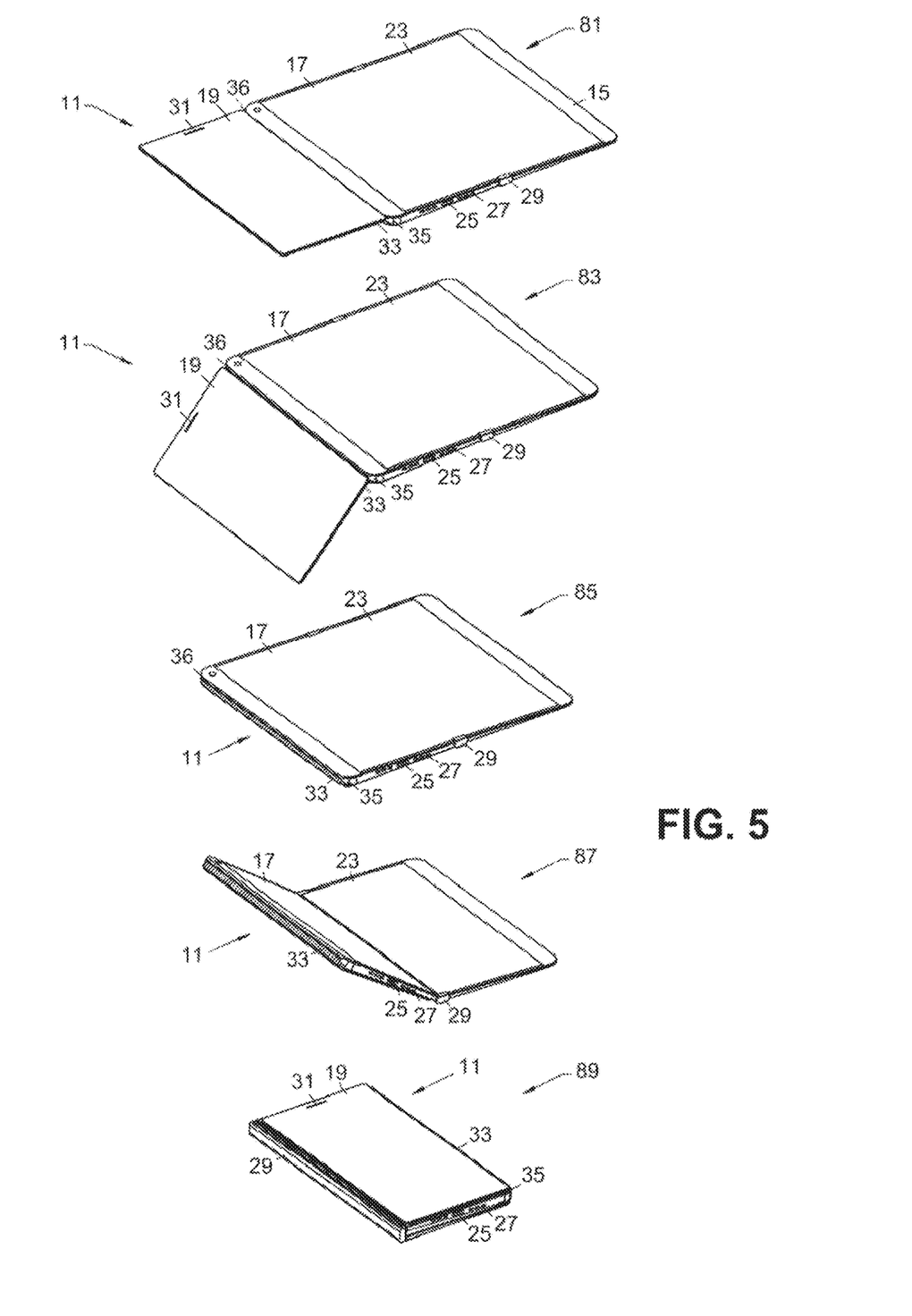
FIG. 5 is a perspective view of a folding sequence for the foldable display device illustrated in FIG. 1 transitioning from an unfolded state to a folded state.
Figure 6:
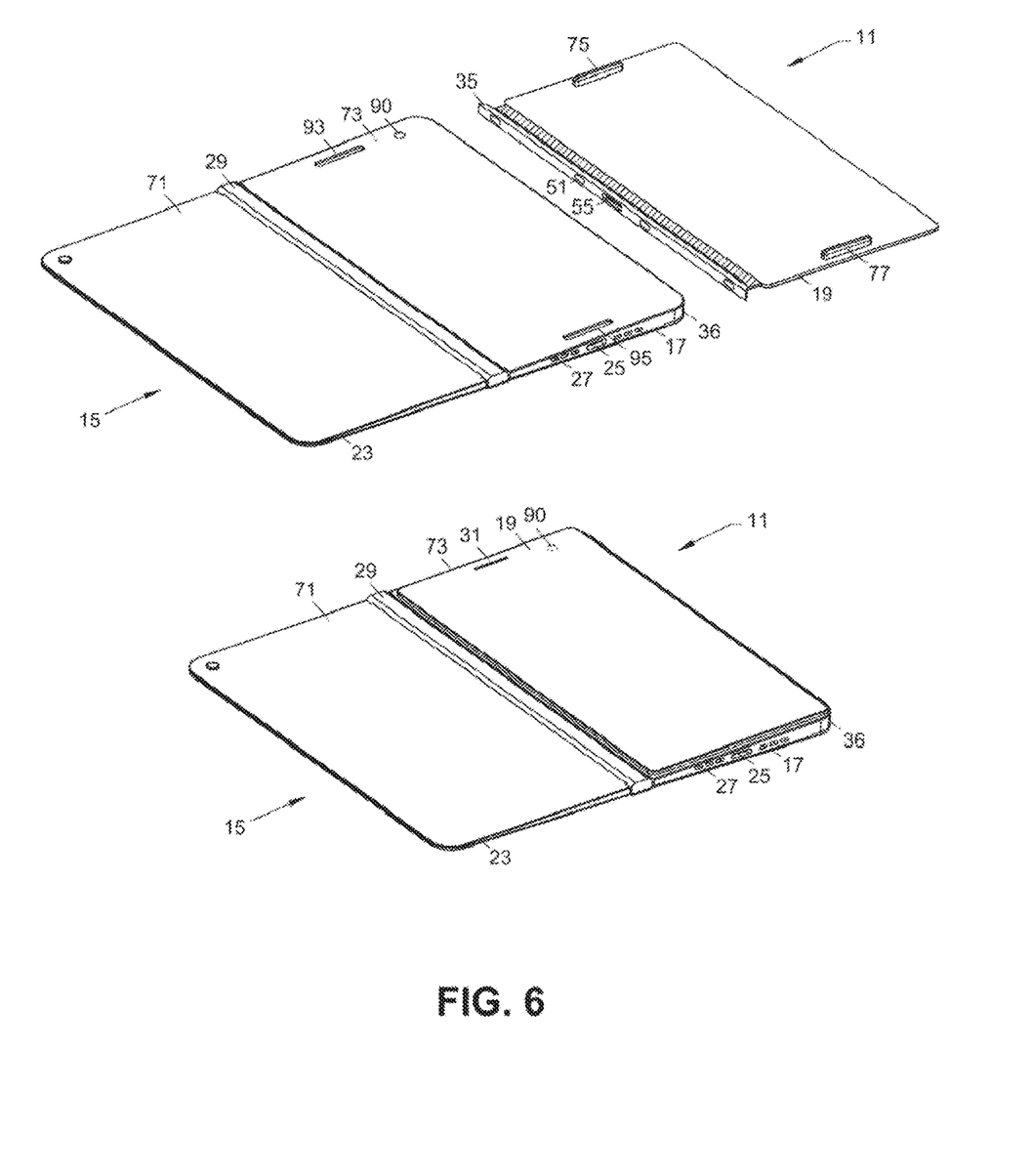
FIG. 6 is a perspective view of one embodiment for a foldable display device with a flexible display portion shown detached and then attached to a modular rigid display portion having interface tabs and a sliding connector.
Figure 7:
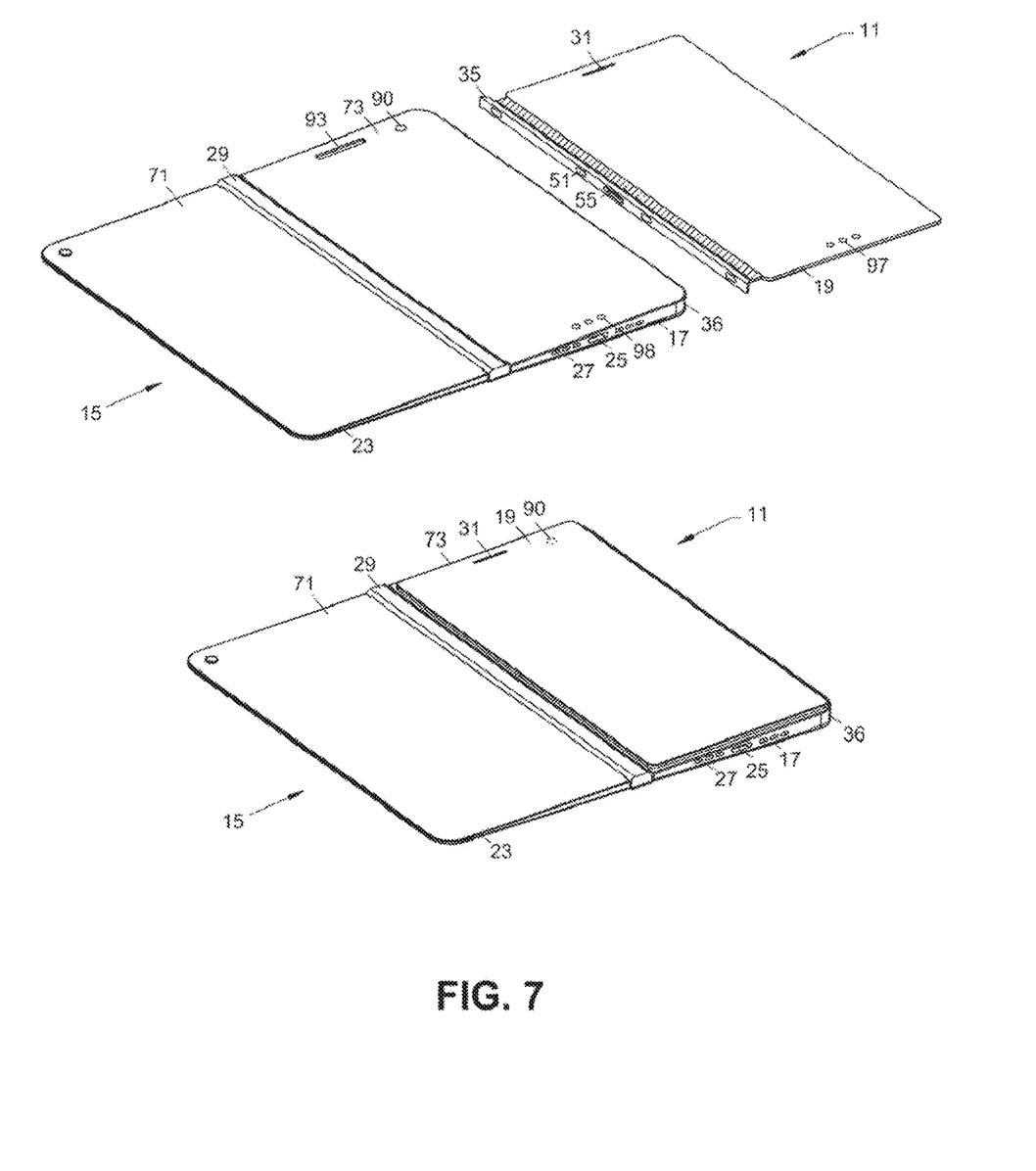
FIG. 7 is a perspective view of one embodiment for a foldable display device with a flexible display portion shown detached and then attached to a modular rigid display having flat interface pads and a sliding connector.
Figure 8:
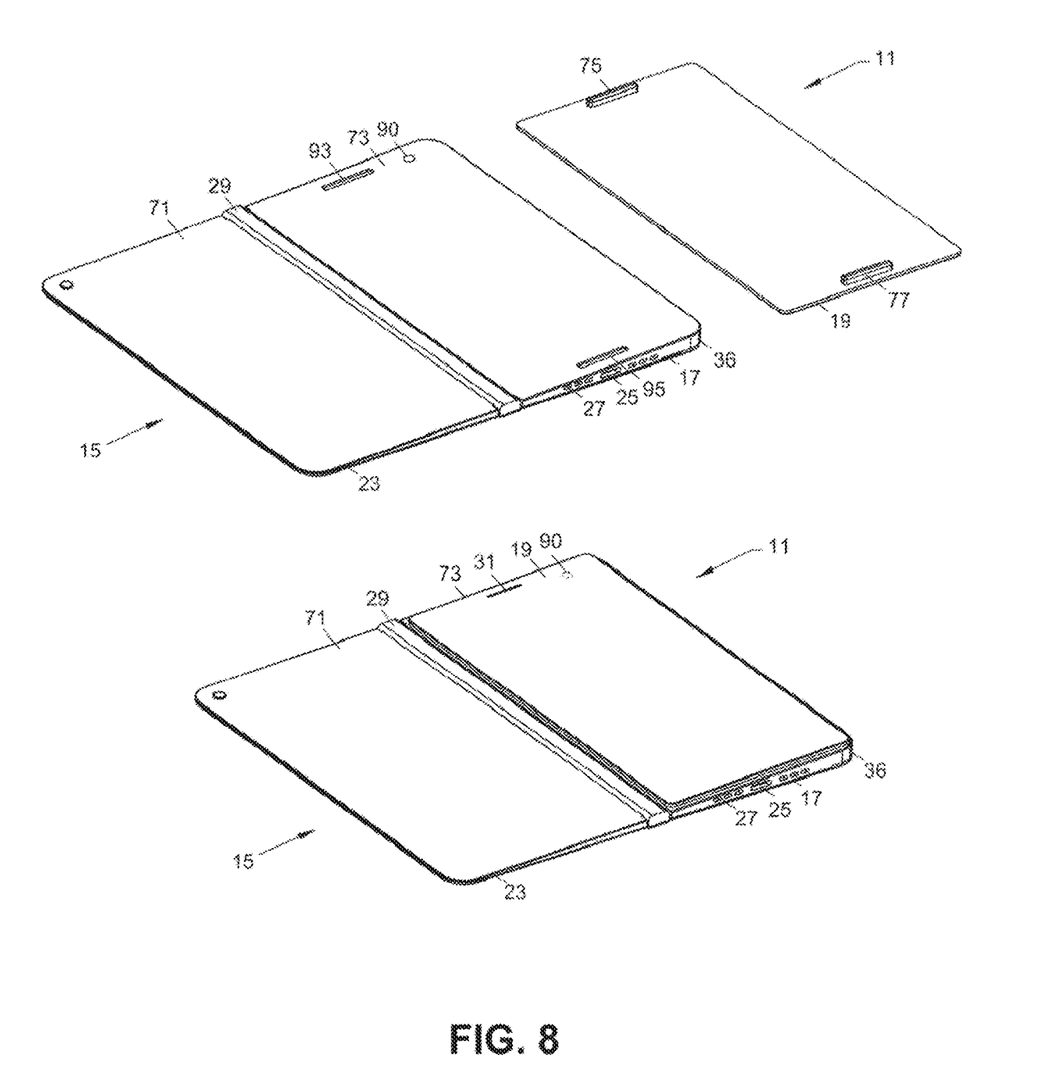
FIG. 8 is a perspective view of one embodiment for a foldable display device with a flexible display portion shown detached and then attached to a modular rigid display having interface tabs.
Figure 9:
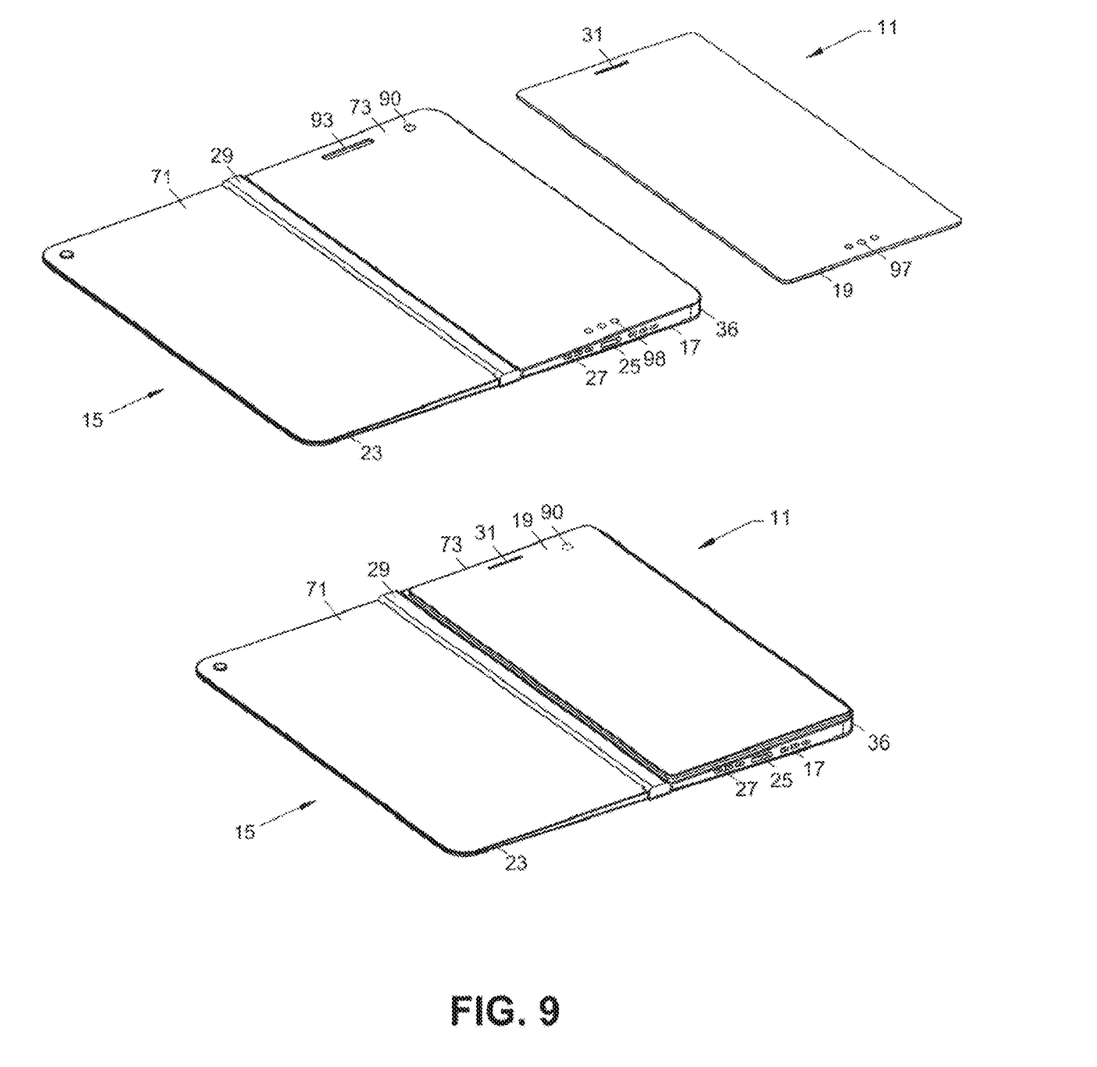
FIG. 9 is a perspective view of one embodiment for a foldable display device with a flexible display portion shown detached and then attached to a modular rigid display having flat interface pads.

In accordance with the exemplary embodiment shown in FIG. 5, position 81 shows foldable computing device 15 situated with rigid display module 11 in a similar position as shown in the final embodiment of FIG. 1 where both parts are attached with each other and fully unfolded. This shows how rigid display module 11 can be situated in an unfolded position so that both rigid display 19 and the flexible display with its segments 23 and 17 from foldable mobile device 15 can be used simultaneously. Positions 83 and 85 show rigid display module 11 folded to the back side of the device, while positions 87 and 89 show the full assembly and flexible display segments 23 and 17 being folded flat against each other such that rigid display 19 from rigid display module 11 can be used as the core display when the device is being used as a handheld phone. This concept is further illustrated in FIGS. 6-9 where each embodiment shows a different interface for modular rigid display 11. In FIG. 6, the embodiment for foldable computing device 15 with an integrated flexible display is shown detached in the top drawing and then attached to modular rigid display 11 in the bottom drawing, which in this case has interface tabs 75 and 77 that connect to slots 93 and 95 and a sliding connector 35. In FIG. 7 the sequence is shown, but in this case modular rigid display 11 is illustrated having flat interface pads 97 that connects to flat interface pads 98 while sliding connector 35 engages with sliding channel interface 36 on foldable mobile device 15. In FIG. 8 the same sequence is shown again but modular rigid display 11 uses only interface tabs 75 and 77 to attach to slots 93 and 95 on the back side of foldable computing device 15, but doesn't include sliding connector 35. Finally, in FIG. 9, rigid display module is shown having flat interface pads 97 that connect to flat interface pads 98 from the back side 73 of foldable computing device 15. Pins may also be used to make the electrical connection between the rigid display module and the flexible display portion. Additionally, camera 90 situated on back side 73 of foldable computing device 15, is able to penetrate a transparent window that sits along the surface of rigid display 19 when it is folded flat and integrated with foldable computing device 15, which is the same case for each embodiment shown in FIGS. 6-9. Additionally, a second camera 91 may be integrated on the back side 71 of foldable mobile device 15 which is also shown in FIGS. 6-9. It is important to note that the rigid display module in each embodiment can also communicate with the flexible display device's primary electronics through a wireless connection, such as with Bluetooth, rather than a physical electronic connection.

The flexible display integrated with foldable computing device 15 may also be implemented with different aspect ratios beyond what is shown in the drawings and through different types of flexible display technologies. The ratios may include ranges that would result in a rectangular unfolded state shape when flexible display segments 17 and 23 are approximately square in shape, and a square unfolded state shape, when flexible display 17 and 23 segments are rectangular in shape, as shown in the drawings. These aspect ratios may range from approximately 22:9 to 1:1 and are applicable to the full flexible display, the segments that make up the flexible display, and the rigid display as well. The flexible display technology may include, but is not limited to OLED, Mini-LED, and Micro-LED technology.

What is claimed is:
1. An apparatus comprising:
 (a) a rigid touch-sensitive display with a display portion situated on one face and a planar connection interface situated on an opposite parallel face of the display portion;
 (b) a flexible touch-sensitive display comprising a first flexible touch-sensitive display portion and a second flexible touch-sensitive display portion; wherein:
  (1) the first flexible touch-sensitive display portion is attached to a first face of a first structural support such that a second face of the first structural support is situated on an opposite parallel face of the first face of the first structural support;
  (2) the second flexible touch-sensitive display portion is attached to a first face of a second structural support such that a second face of the second structural support is situated on an opposite parallel face of the first face of the second structural support;
  (3) the flexible touch-sensitive display further includes a fully folded state;
  (4) the flexible touch-sensitive display further includes a partially expanded state;
  (5) the flexible touch-sensitive display further includes a fully expanded state;
 (c) a planar connection interface situated on the second face of the first structural support or the second face of the second structural support such that the planar connection interface of the rigid touch-sensitive display couples with the planar connection interface of the first structural support or the second structural support when the rigid touch-sensitive display and the first structural support and the second structural support are tangent and aligned with each other.
2. The apparatus of claim 1 wherein:
the planar connection interface of the rigid touch-sensitive display and the planar connection interface of the first structural support or the second structural support can be attached to each other through magnets.
3. The apparatus of claim 1 wherein:
the planar connection interface of the rigid touch-sensitive display and the planar connection interface of the first structural support or the second structural support can be attached to each other through a tab and a slot where the tab is situated on one planar connection interface such that it can engage with a slot situated on the other planar connection interface.
4. The apparatus of claim 1 wherein:
the planar connection interface of the rigid touch-sensitive display and the planar connection interface of the first structural support or the second structural support can be attached to each other through a locking mechanism.
5. The apparatus of claim 1 wherein:
the planar connection interface of the rigid touch-sensitive display and the planar connection interface of the first structural support or the second structural support provide an electrical connection between each other once they are attached.
6. The apparatus of claim 5 wherein:
the planar connection interface of the rigid touch-sensitive display and the planar connection interface of the first structural support or the second structural support provide an electrical connection between each other through conductive flat interface pads once they are attached.
7. The apparatus of claim 5 wherein:
the planar connection interface of the rigid touch-sensitive display and the planar connection interface of the first structural support or the second structural support provide an electrical connection between each other once they are attached through conductive pins.

8. The apparatus of claim 1 wherein:

the rigid touch-sensitive display and the flexible touch-sensitive display can communicate with each other through a wireless connection.

9. The apparatus of claim 1 wherein:

the fully folded state comprises a fully folded angle between the first flexible touch-sensitive display portion and the second flexible touch-sensitive display portion that is less than 10 degrees; and the fully expanded state comprises a fully expanded angle between the first flexible touch-sensitive display portion and the second flexible touch-sensitive display portion that is between 170 and 190 degrees; and the partially expanded state comprises an angle that falls between the fully folded state and the fully expanded state.

\* \* \* \* \*